United States Patent [19]
Byron et al.

[11] Patent Number: 5,604,583
[45] Date of Patent: Feb. 18, 1997

[54] COMPUTER VISION INSPECTION STATION

[75] Inventors: David L. Byron, Honeoye Falls, N.Y.; Rory L. C. Flemmer, Independence, W. Va.

[73] Assignee: Bausch & Lomb Incorporated, Rochester, N.Y.

[21] Appl. No.: 407,581

[22] Filed: Mar. 20, 1995

[51] Int. Cl.⁶ .................................................. G01B 11/00
[52] U.S. Cl. ......................... 356/124; 356/394; 356/243; 346/125; 346/129
[58] Field of Search .................................. 356/124, 127, 356/237, 243; 348/86, 125, 129; 382/141

[56] References Cited

U.S. PATENT DOCUMENTS

| | | |
|---|---|---|
| 4,319,270 | 3/1982 | Kimura et al. ........................... 348/125 |
| 4,855,830 | 8/1989 | Davis et al. ............................... 348/86 |
| 5,148,637 | 9/1992 | Byron . |
| 5,333,412 | 8/1994 | Matsuyama . |

*Primary Examiner*—F. L. Evans
*Attorney, Agent, or Firm*—Katherine McGuire

[57] ABSTRACT

A lens inspection system 10 has two cameras 50, 51 for capturing plan and edge images views of a lens 20 and providing pixel data signals representative of the images. The pixel data signals corresponding to the plan and edge images are analyzed by a computer 70. The computer uses the pixel data signals to calculate the circumference of the image, the lengths of radii to circumferential pixels, and the bevel angle of the lens 20. Such data are compared to data stored in memory 710 and a visual display 74 indicates the difference between the image and the stored data.

18 Claims, 3 Drawing Sheets

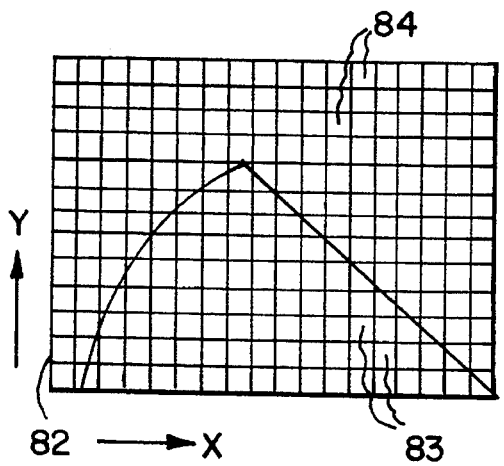
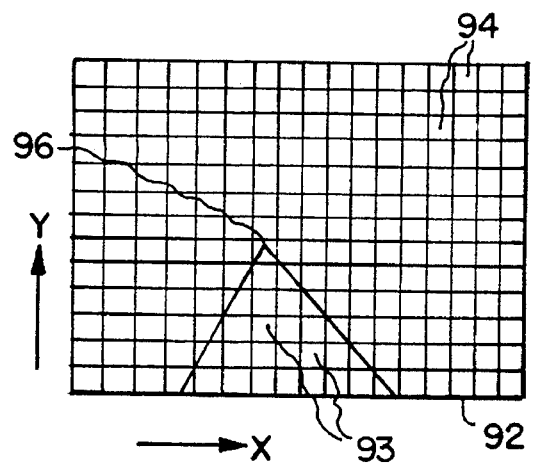
FIG. 7  FIG. 8
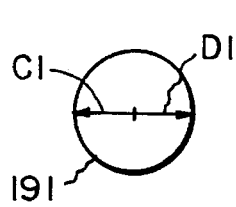
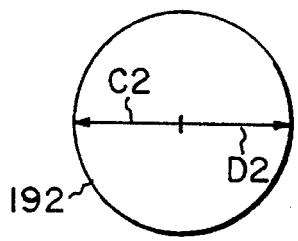
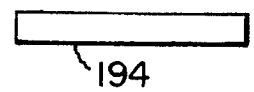
FIG. 9A  FIG. 9B  FIG. 9C
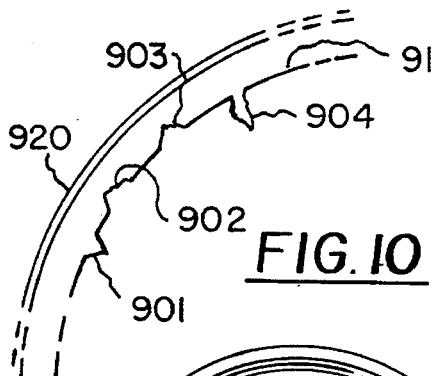
FIG. 10
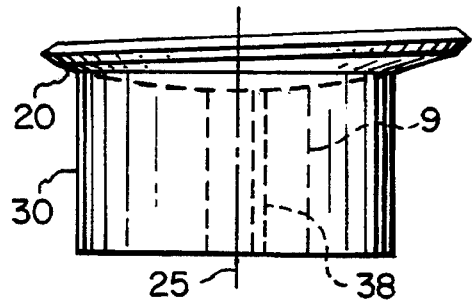
FIG. 11
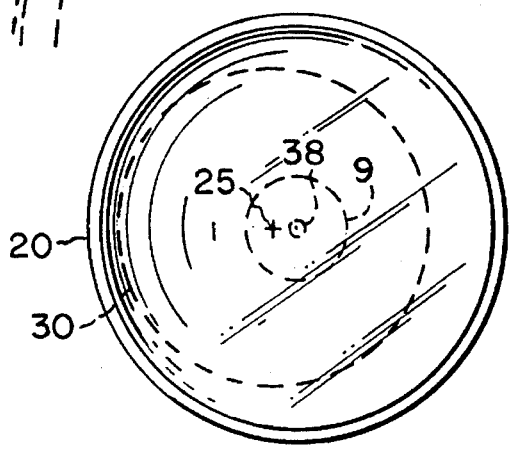
FIG. 12

COMPUTER VISION INSPECTION STATION

This invention generally relates to inspection systems, and, in particular, to computer inspection systems for lenses.

BACKGROUND

Lens edging machines are well-known in the art, and different types are described in U.S. Pat. Nos. 4,870,784 and 5,148,637. A lens is formed from a blank having a certain curvature in accordance with the desired optical focusing power. The curvature of an ophthalmic lens provides a corrective focusing power. The lens curvature for dark glasses or sun glasses typically provides no corrective focusing power. Having formed the lens blank with the desired curvature, the lens is cut from the blank in a shape that fits into the frame of the glasses. This is accomplished by edging the blank, i.e., grinding the edges of the lens with an edging tool, such as a grinding wheel, until the desired lens shape is reached. If the lens is ophthalmic, the edging process may be performed by a lens edging machine of the type described in U.S. Pat. No. 4,870,784, which uses a groove in the grinding wheel to bevel the lens edge. Another type of lens edging machine typically employed to make non-ophthalmic lenses uses an apex in its grinding wheel to bevel the lens edge. The bevel on the lens edge enables the lens to fit tightly into the frames of the eye glasses or sun glasses. Both types of the lens edging machines rotate the lens blank with respect to the grinding wheel. As the lens blank is rotated, the machine simultaneously changes the displacement between the center of the lens blank and the wheel to achieve the desired shape for the lens.

After completion of the edging process, the lens is subject to a final inspection step. During inspection, the lens is compared to the design parameters used to make the lens. Such parameters include the length of the major and minor axes, the length of the periphery of the lens, the radius of curvature of the lens at points along the periphery, the bevel angle of the peripheral edge of the lens, etc. The inspection process is normally a manual operation wherein trained inspectors compare a sample of a manufactured lot of lenses to design standards.

More specifically, the size is measured using an eye plate and eye wire. The measuring device is initially zeroed using a hardened steel eye plate, one eye plate for every style for every inspection station. Then the eye wire is fitted over the lens to be measured, introducing the possibility of lens abuse in the process, and a reading is taken. Repeated measurement of the same lens by different inspectors may result in measurements that vary by 50 percent or more of the allowable size range. Next, bevel angle is checked, and to do this requires the use of a five-times comparator. The comparator is a magnifier through which a magnified image of the lens edge is viewed and the bevel angle measured using what is little more than an enhanced protractor. The inspection process is fairly subjective, especially so in the case of rounded apex lenses. Apex location is also checked on the five-times comparator, lining up the image with a reference line, zeroing the readout and winding across the edge of the bevel. Accuracy of this method of measurement is barely adequate, given the size of the specification; to perform an effective analysis, a seven-times loop with graticule really must be used. This provides a precision of ±25% of the allowable range.

Lastly, shape is validated by placing the lens on a 5x shadowgraph machine, which projects a magnified image of the lens onto the blueprim. First, the relevant blueprim is retrieved from its file and placed on the lab table. The trained operators, once again, use their subjective abilities to decide whether or not the lens corresponds accurately enough to the true line of the blueprint. If it does not, then the elevation from true shape is a pair of calipers to measure the distance between the edge of the shadow and the true line. Since the true line is at least $^{10}/_{1,000}$th of an inch wide inspectors often fail to measure accurately the shape curve.

As such, the current manual process of inspection is time consuming, unreliable and inaccurate and is often ignored. This has an overall negative impact on the manufacturing process because errors are not timely detected and corrective action is often delayed. The latter results in substantial losses when lens fail to fit their frames and have to be scrapped.

SUMMARY OF THE INVENTION

With the invention, the inspection process is automated, computer controlled, efficient, accurate and reliable. The operator places the lens on the inspection stage, and a short time later, a full readout of all the aspects of the lens is presented in a concise, format. The readout is color-coded, using a red/green, pass/fail system, which allows even an unskilled operator to see whether or not a lens conforms to design specifications. A zero abuse automated handling system potentially allows the rapid inspection of every single lens ground.

The invention can provide an automatic computerized feedback of size and shape characteristics to the computer numerical controlled lens edger, which produced the lens. As such, the lens inspection station can provide a closed loop manufacturing process that virtually eliminates deviations from specification before such deviations result in lenses that fall outside the ranges of the specification. Thus, with the invention, it is possible to provide a completely automatic process that produces consistent lenses without the need for operator intervention.

An intelligent vision system detects the operator's hand in the inspection area as he places the lens on an inspection nest machined into the top of a rotatable peg and turns on air flow through the center of the peg. This air flow serves a dual purpose. First, it purges both the nest and surface of the lens of any grit that might cause lens abuse. Second, it serves as an air bearing, allowing the lens to come to rest on the peg at the gravitational center of the lens. Suction is then applied to the lens to fix it firmly to the nest during the inspection process. The lens is then rotated twice, during which time the complete inspection process is carried out; the data is then output to a display such as a computer screen. Thus, operator involvement is kept to a minimum and no training in operation is required.

The invention combines state of the art technology and sophisticated mathematical analysis. High resolution CCD cameras are used in conjunction with a high-speed pixel clocking frame grabber board. The two cameras capture plan and elevation views of the lens rotating on the stage. The captured images are converted into a stream of digital pixel signals by an analog to digital converter. The pixel signals are either stored in a memory or are processed on-line to provide data signals representative of the shape and size of the lens, the bevel profile, and the size and location of the apex and bevel angle. A sigmoid curve fit is applied to the pixel profile, allowing sub-pixel interpolation with a high degree of accuracy due in part to the superiority of the curve fit to conventional linear interpolations.

Calibration of the inventive system is automatic, requiring only that the operator place two metal calibration discs on the stage thus, minimizing set up time and training.

Thus, the invention provides a powerful and flexible measurement system tailored to the process requirements of the lens manufacturer. New lens styles can be checked as soon as they are programmed and cut by the lens edger, allowing for an unprecedented freedom and speed of new style implementation.

DESCRIPTION OF THE DRAWINGS

FIG. 7 is a magnified image of a portion of FIG. 4;

FIG. 8 is a magnified image of a portion of FIG. 5;

FIG. 9a, 9b, and 9c are views of the calibration discs;

FIG. 10 is a highly magnified portion of the edge 18;

FIG. 11 is a partial elevation view of a lens on the nest;

FIG. 12 is a partial plan view of a lens on the nest.

DETAILED DESCRIPTION

Figure 1:
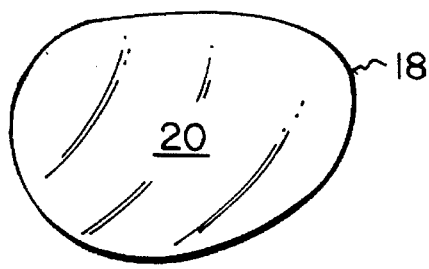
FIG. 1 is a plan view of a typical lens.
Figure 3:
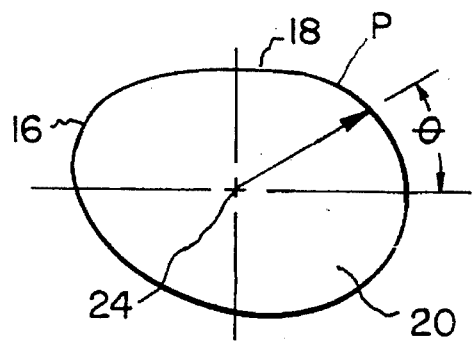
FIG. 3 is a schematic view of the lens of FIG. 1 showing the length of a radius of curvature at an angular location.
Figure 2:
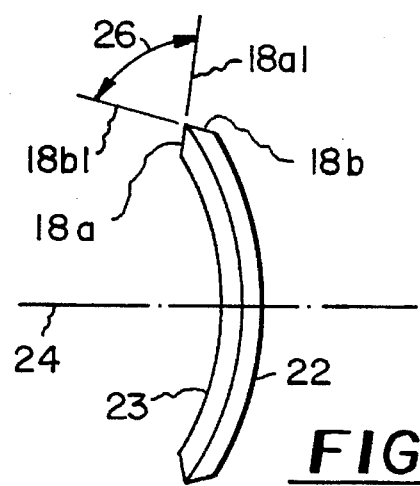
FIG. 2 is an edge view of the lens of FIG. 1.

With reference to FIG. 1, a lens 20 has an edge 18. As shown in FIG. 2, the lens 20 has an optical axis 24 with a major surface 22 substantially normal to the axis 24. The curvature of surfaces 22 and 23 of the lens 20 may be different. The edge 18 has bevel surfaces 18a, 18b. Apex angle 26 is the angle formed between imaginary lines that extend the surfaces 18a1, 18b1. With reference to FIG. 3, the lens 20 has a circumference 16 and any point, P, on circumference can be defined by its radial distance from the optical center 24 at an angle θ.

Figure 4:
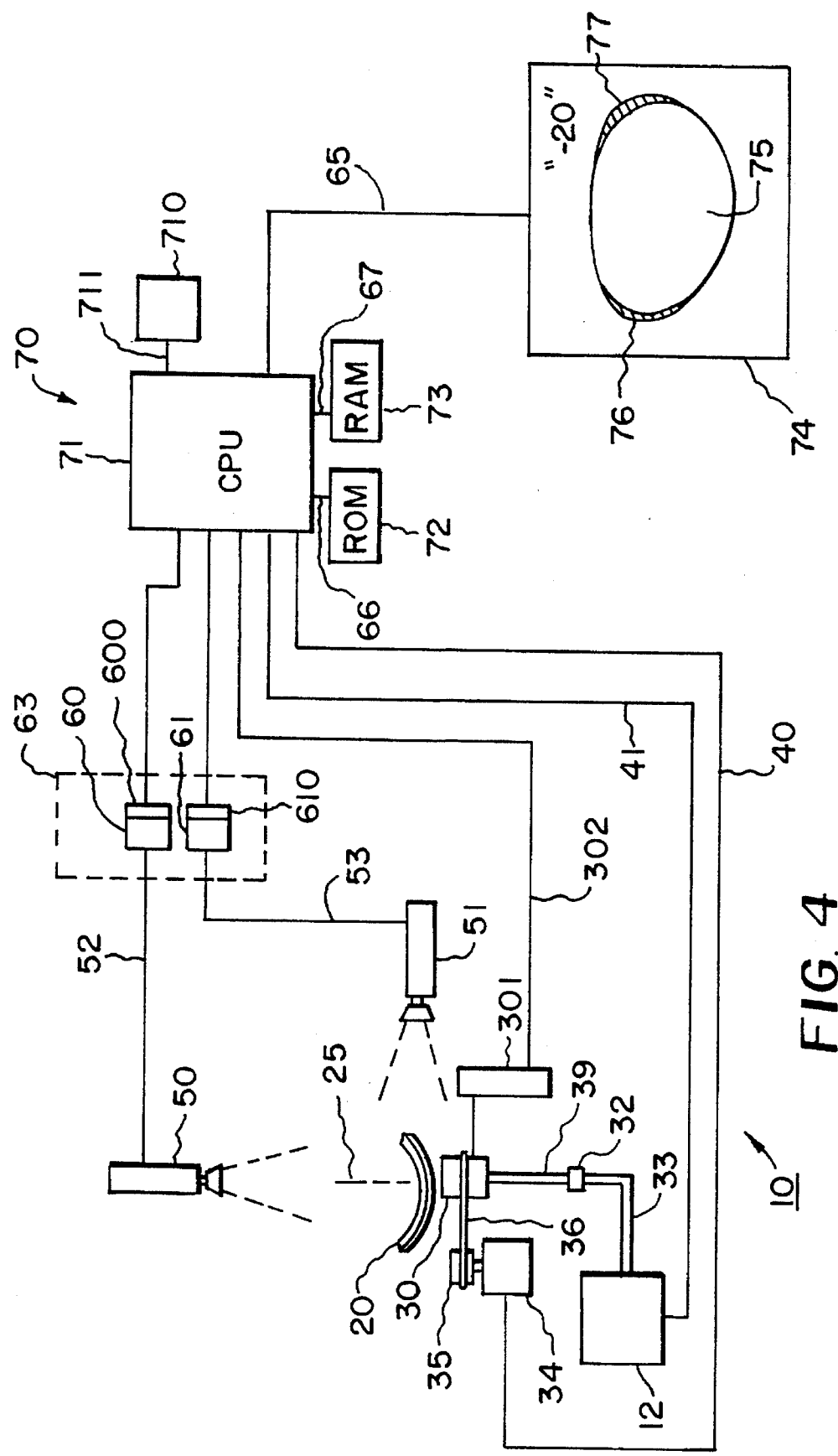
FIG. 4 is a schematic representation of the lens inspection system.

The lens inspection system 10 is described with respect to FIG. 4. There, a lens inspection system 10 has a nest 30 on which a lens 20 is placed. In the preferred embodiment, the lens 20 is placed concave side up on the top of the nest 30. The nest 30 is adapted to rotate about axis 25 under the influence of a drive belt 35 and motor 34. As shown in FIGS. 11, 12 the nest 30 has a peg 9 that rises vertically to receive a lens 20 onto nest 30 so that the lens 20 will rotate in on eccentric manner with respect to axis 25. A fluid conduit 39 terminates in an orifice (not shown) in the surface of nest 30. Conduit 39 carries fluid under pressure or establishes a vacuum at the end of the orifice. Conduit 39 is coupled via a nipple 32 and second conduit 33 to a vacuum/pressure source 12. The motor 34 has a control line 40 for carrying control signals to it. Likewise, the pressure/vacuum source 12 has a control line 41 that similarly carries control signals to it. An encoder 301 provides signals on signal line 302 representative of the angular position of the nest 30.

Figure 5:
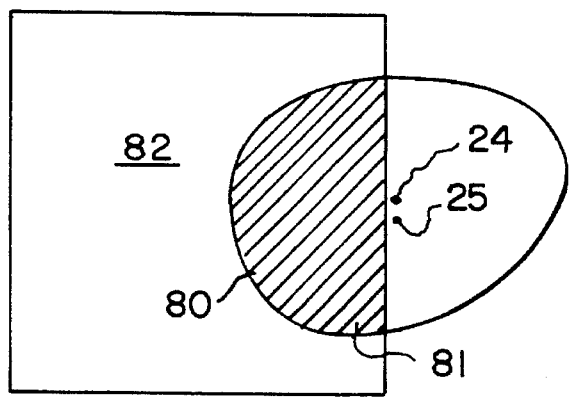
FIG. 5 is a view of the field of camera 50.
Figure 6:
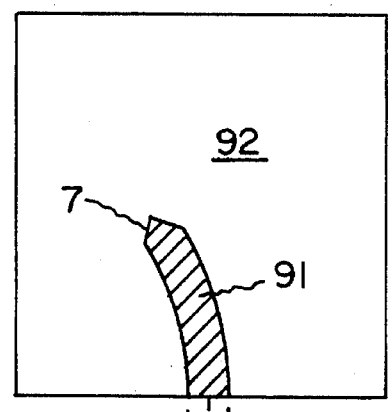
FIG. 6 is a view of the field of camera 53.

Above the lens 20 and slightly offset from the axis 25 of the nest 30 is a first CCD camera 50. As shown, in FIG. 5 the camara 50 has an image field 82 and captures of the plan view of the lens 20. As shown in FIG. 6, a second CCD camera 51 is disposed generally perpendicular to the axis 25 and captures an image of the edge 18 of the lens 20. Both cameras 50, 51 generate an output series of signals representing first and second video signals of plan and edge images of the lens 20 respectively. These images are carried via signal output lines 52, 53.

The control signals on lines 40, 41 and the first and second image signals on lines 52, 53 are coupled to a computer 70. The computer 70 includes a central processing unit 71 that is generally mounted on a mother board (not shown). Computer 70 also has one or more memories including read only memory (ROM) 72, a random access memory (RAM) 73 and an archival memory 710, such as a disc drive. The ROM 72 and RAM 73 are coupled to the CPU 71 via respective buses 66, 67. The first and second input image signals 52, 53 are coupled to A/D converters 60, 61, respectively, which are mounted on a frame grabber board 63. The A/D convertors 60, 61 convert the analog video outputs of cameras 50, 51 into digital signals that are then input to the CPU 71. Alternatively cameras may be used which transmit digital rather than analog signals. The CPU 71 may be a microprocessor or may be any suitable device capable of handling digital signals and performing arithmetic and logical operations on those signals. In the system 10, the CPU 71 has software stored in the memory 72 and/or 73, operates upon the input signals from A/D convertors 60, 61 and processes these signals.

The CPU 71 has an output line 65 that is coupled to a visual display 74. The visual display 74 may be a video display terminal or a liquid crystal display or any other suitable visual display. In the display 74 there is shown a plan view of a lens 75. The shaded portion 76 indicates the area of the lens 20 that does not correspond to the predetermined lens profile of the desired lens shape.

With reference also to FIGS. 5–8, the camera 50 captures an image field 82 that includes at least a partial plan profile image 81 of the lens 20. In a similar manner, the CCD camera 51 captures an image in an image field 92 that shows the profile or edge image 91. The image field 82 comprises a plurality of pixels. A number of pixels 84 comprise background pixels. Other pixels 83 are darker and correspond to the plan image 81 of the lens. Likewise, image field 92 includes a plurality of background pixels 94 as well as pixels 93 that provide image data of the edge 18.

The CCD cameras 50, 51 capture a plurality of pixels at a given time including the background pixels 84, 94 and the image or foreground pixels 83, 93. Each camera 50, 51 has an aperture mechanical or electronic that closes after a predetermined amount of time. Once the aperture (not shown) is closed, the charge coupled signals are output via lines 52, 53 to the respective A/D convertors 60, 61. The A/D convertors 60, 61 convert the analog CCD signal into a plurality of data signals. The data signals are stored in a bit mapped memory.

The CPU 71, under control of suitable software, compares the first and second input data image signals to stored first and second data image signals. As such, the data image signal of the plan image is compared to a first stored plan image data signal and the second data image of the edge of the lens 20 is compared to a second stored edge image data signal in disc drive 701. As a result of that comparison, an output image signal is placed on output line 65 and sent to the visual display unit 74. There, the area 76 of the image 75 indicates how the actual lens 20 has deviated from the desired lens.

In operation, the vacuum and fluid source 22 in its idle state maintains a small steady stream of fluid discharging through orifice 38. An operator approaches the nest 30 and places a lens 20 with a surface 22 covering the orifice 38. The camera 50 senses movement in its field of view. In response to the sensed movement CPU 71 actuates the pressure/vacuum supply 12 is actuated to increase the pressure, raise the peg 9 to receive the lens 20. The peg 9 is lowered and the pressure/vacuum supply 12 establishes a vacuum to hold the lens 20 on the surface of the nest 30. With the lens 20 secured to the surface of the nest 30, CPU 71 sends a signal via control line 40 to turn on the motor 34 that drives the belt 35 to turn the nest 30. As the nest 30 turns, the lens 20 rotates through the fields of vision 82, 92 of CCD cameras 50, 51. The CCD cameras 50, 51 generate analog signals of the image captured in their fields at a given time. Those analog signals are converted to digital signals by A/D convertors 60, 61 and the digital data signals are fed to CPU 71. The CPU 71 compares the input image signals to predetermined signals representative of predetermined shapes for the plan and edge of the lens 20. Such predetermined shape signals are stored in RAM 73. After comparing the input data signals to the stored data signals, CPU 71 outputs the comparison signal via output line 65 to visual display unit 74. Once the process is complete, the system 10 remains idle until the lens 20 is removed and the next lens is placed on the nest 30.

The following discussion explains how CPU 71 analyzes data from the CCD cameras 50, 51. The cameras 50, 51 capture thirty images (frames) each second; these thirty frames are transmitted to the A/D converters 60, 61. The output, digital frame data signals are stored in RAM 73. Each A/D converter 60, 61 has on-board memory 600, 610, respectively, which acts as a frame grabber of data captured by the respective cameras 50, 51. The memories 600, 610 each have four megabytes of ram so that each can hold an image and the CPU 71 can access the held image pixel by pixel. Each captured image is analyzed as explained hereinafter.

A premise underlying the operation of the system 10 is the recognition that one cannot precisely measure features of the lens 20, and the cameras 50, 51, the optical axis 24 and the rotational axis 25 cannot be precisely aligned. Therefore, system 10 assumes such inaccuracies and accounts for them in the computer program stored in ROM 72, which operates the computer 70. The system 10 captures the image of the lens, searches a data base stored on a hard disk 710 that holds lens data corresponding to the major features of the lens, compares the characteristics of the image to the selected lens data, and displays a visual indication of the variations between the image and the lens data.

Prior to comparing the measurement data to the lens data set, a calibration correction is made for misalignment. It has been found that the optical center of the lens data is often not coincident with the axis of the nest 30. In other words, the lens 20 on the nest 30 is slightly tipped. Since the archival lens data in memory 710 is data for a lens that is in alignment with the rotational axis of the nest 30, a suitable software routine rotates the lens data in three dimensions to align the optical axis of the lens characterization data with the rotational axis of the nest 30. Such alignment correction will rotate the lens data about its optical axis and move the lens data in the xy plane to make the coincidence between the lens data and the archival data as accurate as possible. Such alignment correction is facilitated by an initial calibration of the system 10.

The system 10 is calibrated with a pair of thin calibration discs, 191, 192 shown in FIGS. 9a, 9b, and 9c. The discs 191, 192 are circular and have different diameters, D1 for disc 191 and D2 for disc 192, with D1 being less than D2. D1 is placed on the nest 30 and is deliberately located off center so that its subsequent rotation will define an eccentric path through the image field 82 of camera 50. Since the radius C1 of disc 191 is known, and the angular position θ is known from encoder 310, and the x,y coordinates of any pixel in the field of 82 of camera 50 is also known, a simple calculation will give the user the coordinates of the center of rotation 25 of the nest 30. Each disc 191, 192 is rotated through two or more revolutions and a number of calculations of the center of nest rotation are performed during each revolution. Then a spacer 194 of a known thickness, e.g., a quarter of an inch, is placed on the nest and each disc 191, 192 is again eccentrically rotated through two or more revolutions and measurements are taken at a number of angular locations per revolution. The spacer 194 provides information on z-axis effects. By collecting data for different apparent thicknesses, the system 10 is calibrated to account for the fisheye effect of a real lens. With the data from the four revolutions a regression calculation is performed to yield a coordinate location for the center of rotation 25 of the nest 30 with respect to the image field 82 of camera 50. Since the image field 82 is substantially smaller in size than an image of the entire lens 20, the accuracy of the measurements made on the image in field 82 is greatly increased.

The calibration operation also provides the computer 70 with a number of geometric parameters that are used to correct for inherent physical imperfections on the components of the system 10 and to find critical locations, such as the center of rotation of the nest 30. The geometric parameters are typically stored on hard disc 710 and are accessible by the computer 70. These parameters include (1) the distance between the center of the lens of CCD camera 50 and the nest, (2) the angle of diversion of the camera 50, which is a function of the camera lens and the adjustment of the lens, (3) the setting of the aperture in order to distinguish bright from dark as this becomes a dynamic threshold, (4) the angle of tilt of the camera because the camera is never pointing perfectly downward. In particular, the computer program in ROM 72 needs to know the angle of tilt in two directions because the image 80 is distorted in two planes.

Camera 51 captures a portion of the edge profile of lens 20 in its field 90. As a result of the calibration step, the center of rotation 20 of the nest 30 is known. The image in field 92 is used to derive the location of the apex 27 from the center of rotation 25 and the bevel angle 26. The bevel angle 26 can be calculated from the coordinate locations of the edge pixels of the image in field 92. The stored lens data on disc drive 710 has the locations of the apex with respect to the optical center of the lens. As such, the stored lens data is converted into profile data corresponding to the image in field 92. The stored lens data is converted by a suitable subroutine that calculates shadow image data. Such shadow image data is the shadow image that a lens, made in accordance with the archival data, would cast if illuminated by light from the center of the lens of camera 51 projected onto the image plane of the camera 51. In other words, the subroutine uses the archival lens data to construct a set of data signals corresponding to the image appearing in field 92. The data pixel signals of the actual image and the shadow data image signals are compared for differences as explained hereinafter.

When a lens 20 is placed on nest 30, the lens passes through field 82 of camera 50. The computer 70 then operates on the pixel data signals from the image in field 82 and extracts a set of radii of the edge 18 of the lens 20 as compared with the center of rotation 25 of the nest 30. The computer 70 further analyzes the image field 82 by counting the pixels comprising the periphery of the image. Since the pixels are the same size, a count of the pixels yields data corresponding to the length of the circumference 16 of the lens 20. To compute the periphery points on the edge are measured to sub-pixel accuracy and translated into r, θ, z co-ordinates. A spline is then fitted through this three-dimensional data with suitable modifications to control spline stiffness. The spline stiffness is controlled to approximate the deflectional performance of an eyewire as it goes around a lens. In order to do this, the computer program in ROM 72 accesses the calibration data for such parameters, which are stored either in the RAM 73 or on hard disc 710. The image 80 captured by the camera 50 is analyzed to extract from the image a set of true radii at various points on the image. With reference to FIG. 4, a mechanical encoder 310 provides an output signal representative of the rotary position of the nest 30. The nest angular position signal is provided to the computer 70 and stored in RAM 73. Readings between encoder positions are interpolated on the basis of an assumed constant rotational speed. As such, the radii of the lens is computed at a number of angular positions. The measurement of the radius at any one position is stored in memory with the angular position of the lens. With captured images of the lens and information about its angular position and rotation speed, the various radii are computed and stored as a set of data doubles, where each data point contains the radius of the lens at a certain angular position. The initial position of the lens is chosen as the base position and subsequent angular positions are compared to the base position. Since there is a difference between the optical center of lens 24 and the center of rotation 25 of the nest 30, a further subroutine converts the measured data of radii and angular position to radii and angular positions corresponding to the optical center.

It is known that the lens of the camera itself distorts the image captured by the camera retina. Such distortion, known as the fisheye effect, is corrected by software in the computer program. By accounting for the fisheye effect, one can get a true radius of the lens at every point irrespective of the fact that the lens edge varies in vertical height in the field. In this regard, those skilled in the art will appreciate that as the lens 20 rotates, the distance between camera 50 and the edge 18 of the lens 20 varies, i.e. sometimes the edge 18 is closer to the camera 50 and sometimes the edge 18 is farther away from the camera 50. Because the lens has both a shape curve and a base curve, sometimes the edge 18 of the lens 20 is closer to the center 84 of the camera field and sometimes closer to the periphery 85 of the camera field. As such, it is required to precisely model the whole three-dimensional camera field in order to get the true radius at a true rotational position. The system 10 accomplishes this modeling by capturing thirty (30) images of the lens 20 each second, rotating the lens 20 for 6 seconds to generate between 180 or 200 images of the lens. From each image the system 10 obtains about 10 radii so that at the end of the inspection there are accumulated between 1,800 to 2,000 radii versus known rotational angles at which the radius is measured. This characterizes the lens absolutely.

The next step in the analysis is lens recognition. In lens recognition the lens data is analyzed to provide the magnitude of the major axis of the lens, the magnitude of the minor axis of the lens, and the local curvature variation around the edge 18. That recognition data is compared to corresponding data stored in a directory of archival data in disk drive 710 in order to recognize the lens, to recognize the style of the lens and also to recognize the chirality of the lens, i.e. is the lens a left lens or a right lens.

For example, the data received and calculated by the computer for the lens of FIG. 1 yields measurements of a major axis of 1.75 inches, a minor axis of 1.25 inches, and three radii of highest curvature. Such radii are typically the radii in the regions of the lens near the temple, nose and cheek of the wearer. For this example, assume the three radii are 0.875 inches, 0.9375 inches and 0.75 inches for the temple, nasal and cheek curves. Such measurements constitute lens classification data and such data is normally different for different lens. The computer 70 will compare the classification data of the measured lens to classification data of different lens designs that are stored on hard disk 710 as lens data sets L1, L2, L3 . . . LN. Each lens data set also includes the peripheral length circumference of each lens design. The lens data set that has classification data closest to the measured classification data is determined by a comparison subroutine well known to those skilled in the art. As an alternative, an operator may program the computer 70 to compare the measured classification data to one of the data sets. So, if the operator knows that the measured lens was designed to correspond to lens data set L7, then the measured data is compared to lens data set L7 and the computer 70 does not search the other data sets for the closest correspondence of key measurement features.

The next step is comparing the lens characterizing data to the selected archival lens data to determine the differences between the two sets of data. The system 10 measures the greatest difference in radius between the archival lens data set and the measured lens, both positive (an "extrusion") and negative (an "intrusion"). At this point a further correction is made for chips in the apex surface of the lens.

Chips in the apex introduce errors into the measurement of the periphery of the lens. The periphery of the lens is defined by bevel surface 91 of the lens. As shown in FIG. 10 the bevel surface 91 is irregular due to chips 901,902 in the surface 91. The chips are introduced in the surface 91 when the lens is ground out by sharp diamond points; which are imbedded in a lens grinding wheel. Therefore, the bevel surface 91 of the lens is in fact defined by a set of little scratches. Where these scratches intersect the apex 92 of the bevel 91, they manifest themselves as small chips 901,902 in the bevel surface 91. Many of the chips 901,902 are a tenth of a thousandth of an inch deep but some can be as deep as five thousandths or ten thousandths of an inch deep. In the normal course of producing a lens, such chips are not a problem. When one places this lens in an eye wire, either for measuring or to fit it into their eyeglass frame, the eye wire tends to ride over the chips and the eyewire is supported on the protrusions between the chips. However, the inventive system 10 is accurate enough to be measure the segments of length that chips 901, 902 contribute to the periphery of the lens length and indicate an error when, as a practical matter, the small errors introduced by the chips can be ignored. In this regard, the measurement system 10 can measure to about one thousandth of an inch or better over a periphency of about 6 inches. As such, the measurement of the periphery of the lens will include numerous segments of extrusion and intrusion lengths. The lengths of the intrusions and extrusions are generally irrelevant. However, with the extraordinary degree of precision possible with the invention, the measurement of the length down into the chip and up out of the chip will rapidly use up the total margin of acceptable error. As such, the errors introduced by chips are accounted for by a spline subroutine in the measurement analysis system.

The spline subroutine fits a data spline 920 of a certain stiffness to the lens data. The system 10 provides the data spline 920 with a rigidity that approximates the rigidity of an eye wire which will fall to a certain extent into some of the holes but won't go all the way. For instance, if a chip is 0.020 inches long and 0.005 inches deep, the data spline 920 correction for the periphery will bow upwards in an appropriate way which approximates the way in which an eye wire would bow upwards over the chip rather than going straight across it. Likewise, the data spline correction will bridge an intrusion. Therefore, it is the function of the spline correction subroutine to mimic the physical behavior of an eye wire.

Having measured the shape of the lens and the periphery, the next step is to determine the bevel conditions. For this, system 10 uses data from the second camera 51. The second camera 51 does not capture bevel during the first revolution of the lens. The reason for this is that you can only obtain a clear view of the edge of the lens at certain: orientations. At many positions of rotation you cannot see an unobscured profile because the lens obscures what you want to see. When the lens is rotated such that no other portion of the lens obscures the view from the side, then you can see the profile of the bevel. Accordingly, an analysis is done to determine those rotational positions at which we wish to measure. Generally, those correspond to the positions of highest curvature of the lens. Such positions include the nasal, temple and cheek regions discussed above.

Having captured the bevel images and computed the places at which bevel measurements are to be made, the second rotation of the lens 20 is initiated. When lens 20 reaches the appropriate rotational position, some fifteen images are captured in the region of the place in which we wish to measure, the lens is rotated to the next position and another fifteen images are captured, and then to the final position where fifteen more images are captured. In this way, the invention acquires a succession of images covering the peak rotational positions. These are the most important positions for measuring the bevel profile. Software is then applied to extract from this data the true bevel profile, the bevel profile data is smoothed and interpolated in a manner well known to those skilled in the art to derive an optimal image. From the optimal image, the apex location 92 is derived.

With reference to FIGS. 1, 3, and 8, the apex location 96 is defined by, but is hot identical with the distance from the convex side 22 of the lens up to the apex 96. The apex 96 is the point where the bevel surface 18a, 18b meet to form bevel angel 26. In an actual lens, the juncture of surfaces 18a, 18b may be irregular due to the grinding wheel (not shown) that creates the beveled surfaces 18a, 18b. Once one has obtained that angle 26, simple trigonometry will yield the apex location 96 as defined by the lens design.

Next, the information derived from the analysis of the lens 20 is visually displayed on a monitor 74. The form of the visual display 75 is an image of the lens 20 including an indication of the peripheral length of the lens as a differential from the correct length. For example, the display may indicate "–20" which means –20 hundredths of a millimeter relative to the desired size. The display also shows the apex angle and reports the apex location. The apex location is reported in a small block at the three important points on the lens at which the apex angle was measured, i.e., the nasal; the temple and the cheek. The display further includes two regions 76, 77. The first region 76 is located on the periphery of the lens image 75 where the radius of the lens 20 was erred by the largest amount on the smaller side of the lens 20; the region second 77 indicates where the radius erred by the largest amount on the larger side. The display and the indication are color coded in terms of the manufacturing allowable range and any measurement that is outside the range is shown in red. Any measurement that is inside the range is shown in green.

Having thus described the preferred embodiment of the invention, those skilled in the art will appreciate that various additions, changes, modifications, and alterations and equivalent substitutions may be made to the components of the preferred embodiment without departing from the spirit and scope of the appended claims.

What we claim is:

1. A process for inspecting a lens comprising:

rotating a lens;

taking first and second video images of the rotating lens, said first image being taken of a major surface of the lens and said second image being taken of an edge of said lens;

converting said first and second images into first and second image signals, said first and second image signals comprising a plurality of digital signals representative of the first and second video images;

comparing said first and second digital images to first and second stored data signals representative of a predetermined major surface and a predetermined edge.

2. The process of claim 1 further comprising generating an output video image representative of the comparison of said first and second stored data signals and said first and second image signals.

3. The process of claim 1 further comprising the step of providing a lens nest for supporting and rotating the lens.

4. The process of claim 3 further comprising the step of providing a source of fluid pressure to raise the lens above the nest and removing fluid pressure to center the lens on the nest.

5. The process of claim 4 further comprising the step of providing a source of fluid vacuum to hold the centered lens on the nest.

6. The process of claim 1 further comprising taking analog first and second video images of the lens and convening the first and second analog images into digital images.

7. The process of claim 1 further comprising the step of displaying an image representative of the results of the comparison between the first and second image signals and the first and second stored data signals.

8. An apparatus for inspecting a lens comprising:

means for rotating a lens;

first and second video cameras for taking first and second video images of the rotating lens, said first camera being disposed to take a first image of a major surface of the lens and said second camera being disposed to take a second image of an edge of said lens;

said cameras having first and second output image signals, said first and second image signals comprising a plurality of signals representative of the first and second video images;

means for comparing said first and second digital images to first and second stored data signals representative of a predetermined major surface and a predetermined edge.

9. The apparatus of claim 8 further comprising generating an output video image representative of the comparison of said first and second stored data signals and said first and second image signals.

10. The apparatus of claim 8 further comprising a lens nest for supporting and rotating the lens.

11. The apparatus of claim 10 wherein the nest further comprises a source of fluid pressure to raise the lens above the nest and to lower the lens to center the lens on the nest.

12. The apparatus of claim 8 wherein the video cameras provide first and second output analog signals and means for converting said first and second analog signals into first and second digital signals.

13. The apparatus of claim 8 further comprising a video display for displaying an image representative of the comparison of the first and second image signals to the first and second stored data signals.

14. A lens inspection system for inspecting a lens having a major surface, said major surface having a boundary of a contour defined by a relatively thin edge, said system comprising:

a nest having a surface for supporting a lens along a major surface of said lens and for rotating a lens about an axis normal to the major surface of said lens, said nest having an orifice in the center thereof of applying a stream of fluid to raise the lens above the nest and/or for applying a vacuum to the lens to hold the lens on the nest;

first and second video cameras, said first video camera positioned relative to the nest to capture a video image of the shape of the major surface of the lens on the nest and the second video camera positioned relative to the nest to capture an image of the shape of the edge of the lens, said first and second cameras for generating first and second analog output pixel signals representative of the intensity of the images of the shape of the major surface and of the shape of the edge of the lens, respectively;

first and second analog to digital converters for converting the first and second analog signals into a digital signal representative of the intensity of the pixels of the images, a computer including means for receiving the first and second digital pixel data signals, means for providing output signals, a memory and a central processing unit, said memory for holding first and second stored digital pixel data corresponding respectively to a predetermined shape of the major surface and a predetermined shape of the edge; and said central processing unit for comparing said first and second digital pixel data signals to said respective stored first and second digital pixel data signals and for generating an output signal representative of said comparison;

a visual display for receiving said output signal and displaying said output signal.

15. The lens inspection system of claim 14 wherein said first camera generates signals representative of the circumference of the lens.

16. The lens inspection system of claim 14 further comprising means for calculating lengths of a plurality of radii of the lens image from the center of the lens image to a corresponding plurality of locations on the circumference of the lens image and means for comparing each of said calculated radii lengths to stored data representative of desired lengths of radii at said locations on said circumference.

17. The lens inspection system of claim 14 wherein said second camera generates signals representative of the bevel angle of the lens.

18. A process for calibrating a lens inspection system comprising the steps of eccentrically rotating a circular calibration disc having a known radius about a center of rotation spaced from the center of the disc;

capturing a plurality of images a portion of the eccentrically rotating disc;

recording the angular position of the captured images;

generating a plurality of pixel data signals of the captured images of the eccentrically rotating disc including pixel data signals representative of the circumference of the disc, each circumferential pixel data signal having a corresponding known coordinate location in the captured image of the disc and a known angular position;

locating the center of the eccentric rotation of the calibration disc using the known radius of the calibration disc, the coordinate locations of the circumferential pixel data signals, and the angular positions of the locations of the circumferential pixel data signals.

* * * * *